(12) United States Patent
Kawarai (10) Patent No.: US 7,680,157 B2
(45) Date of Patent: Mar. 16, 2010

(54) TRANSMITTING APPARATUS AND CHANNEL SPEED VARYING METHOD

(75) Inventor: Masashige Kawarai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 959 days.

(21) Appl. No.: 11/443,111

(22) Filed: May 31, 2006

(65) Prior Publication Data

US 2007/0177635 A1 Aug. 2, 2007

(30) Foreign Application Priority Data

Jan. 31, 2006 (JP) .............................. 2006-023846

(51) Int. Cl.
*H04J 3/02* (2006.01)
(52) U.S. Cl. .................. 370/537; 370/252; 370/468
(58) Field of Classification Search ................ 370/230, 370/230.1, 231–234, 252, 253, 401, 402, 370/468, 492, 501, 535–545
See application file for complete search history.

(56) References Cited

U.S. PATENT DOCUMENTS

| | | | |
|---|---|---|---|
| 5,793,425 A * | 8/1998 | Balakrishnan | ......... 375/240.25 |
| 6,181,711 B1 * | 1/2001 | Zhang et al. | ................. 370/468 |
| 6,337,849 B1 * | 1/2002 | Smith et al. | ................. 370/230 |
| 7,016,337 B1 * | 3/2006 | Wu et al. | ..................... 370/352 |
| 2005/0281197 A1 | 12/2005 | Honda | |

FOREIGN PATENT DOCUMENTS

| | | |
|---|---|---|
| JP | 2004-120502 A | 4/2004 |
| JP | 2006-13562 A | 1/2006 |

* cited by examiner

*Primary Examiner*—Ricky Ngo
*Assistant Examiner*—Wei-Po Kao
(74) *Attorney, Agent, or Firm*—Staas & Halsey LLP (57) ABSTRACT

A transmitting apparatus connects a first network that includes a plurality of channels each of which having a preset priority and a predetermined bandwidth speed and a second network. A bandwidth-speed adjusting unit retrieves, when a channel speed of the second network changes, the changed channel speed, adjusts the bandwidth speed in such a manner that a sum of the bandwidth speeds of the channels of the first network does is below the changed channel speed and a bandwidth speed of a high-priority channel is not decreased from an inherent bandwidth speed, and resets the adjusted bandwidth speed on each of the channels of the first network.

6 Claims, 7 Drawing Sheets

| CHANNEL | PRIORITY | INHERENT SPEED | APPLICABLE SPEED |
|---|---|---|---|
| ETHERNET CHANNEL 1 | HIGH | 45 Mbps | 45 Mbps |
| ETHERNET CHANNEL 2 | MEDIUM | 45 Mbps | 45 Mbps |
| ETHERNET CHANNEL 3 | LOW | 45 Mbps | 45 Mbps |

TRANSMITTING APPARATUS AND CHANNEL SPEED VARYING METHOD

BACKGROUND OF THE INVENTION

1. Field of the Invention

The present invention relates to a transmitting apparatus and a channel speed varying method and, more particularly to a transmitting apparatus and a channel speed varying method that can automatically reduce the speed of a channel by implementing Link Capacity Adjustment Scheme (LCAS) to improve the quality of the network.

2. Description of the Related Art

Link capacity adjustment scheme (LCAS) as a technology has come into focus for its role in improving the transmission quality of a Synchronous Optical NETwork/Synchronous Digital Hierarchy (SONET/SDH, hereinafter, simply "SDH") network using virtual concatenation (see, for example, Japanese Patent Laid-Open Publication No. 2006-13562).

Virtual concatenation refers to a technology that allows a plurality of SDH channels to be integrated as a single virtually concatenated group. LCAS is a technology that allows dynamically linking channels to or dropping channels from the virtually concatenated group.

By combining LCAS with virtual concatenation, a new channel can be added when the speed of the virtually concatenated group needs to be increased, without interrupting the ongoing transmission and without in any way affecting the operations in the existing channels.

The LCAS can be similarly employed to drop failed channels from the virtually concatenated group. The channel speed in this case is automatically reduced, but the channels are operational albeit at a reduced speed. In the absence of LCAS, failed links will render the entire virtually concatenated group dysfunctional.

The SDH network is generally used as a backbone of a large-scale network. Generally, the network to which the terminal of an end user is connected is usually an easily manageable Ethernet™ (hereinafter, simply "Ethernet") and a high-speed SDH network connects all the Ethernet networks.

In such a setup, at times the dynamic change in the channel speed brought about by LCAS may not produce effective results. Thus, to increase channel quality, routers are provided on the Ethernet network that allow, by a priority control function, frames (packets) of a specific user or specific frames to be carried over the channel. However, LCAS dynamically changes the speed of the virtually concatenated group independently of the priority control set by the routers.

Therefore, when some channels of the virtually concatenated SDH channel group fail, even though LCAS takes care that the normally functioning channels of the virtually concatenated SDH channel group do the job, the channel speed is reduced by the LCAS without regard to the priority control set at the Ethernet end. As a result, the channel speed of the SDH network falls below the speed required for transferring the Ethernet frame, resulting in frame loss regardless of the priority control, which causes a significant reduction in the channel quality.

SUMMARY OF THE INVENTION

It is an object of the present invention to at least partially solve the problems in the conventional technology.

A transmitting apparatus according to one aspect of the present invention connects a first network and a second network. The first network includes a plurality of channels each of which having a preset priority and a predetermined bandwidth speed. The transmitting apparatus includes a bandwidth-speed adjusting unit that retrieves, when a channel speed of the second network changes, the changed channel speed, adjusts the bandwidth speed in such a manner that a sum of the bandwidth speeds of the channels of the first network does is below the changed channel speed and a bandwidth speed of a high-priority channel is not decreased from an inherent bandwidth speed, and resets the adjusted bandwidth speed on each of the channels of the first network.

A transmitting apparatus according to another aspect of the present invention connects a first network and a second network. The first network includes a plurality of channels. The second network is capable of dynamically adjusting a channel speed thereof by using a link capacity adjustment scheme. The transmitting apparatus includes a storing unit that stores a priority and an inherent bandwidth speed for each of the channels of the first network; and a bandwidth-speed adjusting unit that retrieves, when the channel speed of the second network changes, the changed channel speed, takes the inherent bandwidth speed stored in the storing unit as the bandwidth speed of the channels of the first network if a sum of the inherent bandwidth speeds stored in the storing unit exceeds the changed channel speed, adjusts the bandwidth speed in such a manner that a sum of the bandwidth speeds of the channels of the first network does is below the changed channel speed and a bandwidth speed of a channel for which a high priority is set in the storing unit is not decreased, and resets the adjusted bandwidth speed on each of the channels of the first network.

A channel-speed adjusting method according to still another aspect of the present invention is for a transmitting apparatus that connects a first network and a second network. The first network includes a plurality of channels each of which having a preset priority and a predetermined bandwidth speed. The channel-speed adjusting method includes changing the channel speed of the second network; and bandwidth-speed adjusting including adjusting the bandwidth speed in such a manner that a sum of the bandwidth speeds of the channels of the first network does is below the changed channel speed and a bandwidth speed of a high-priority channel is not decreased from an inherent bandwidth speed, and resetting the adjusted bandwidth speed on each of the channels of the first network.

A channel-speed adjusting method according to still another aspect of the present invention is for a transmitting apparatus that connects a first network and a second network. The first network includes a plurality of channels. The channel-speed adjusting method includes changing dynamically a channel speed of the second network by using a link capacity adjustment scheme; bandwidth-speed-over determining including retrieving an inherent bandwidth speed for each of the channels of the first network stored in a storing unit in advance, and determining whether a sum of the inherent bandwidth speeds exceeds the changed channel speed; and bandwidth-speed adjusting including taking the inherent bandwidth speed stored in the storing unit as the bandwidth speed of the channels of the first network if a sum of the inherent bandwidth speeds is determined to exceed the changed channel speed at the determining, adjusting the bandwidth speed in such a manner that a sum of the bandwidth speeds of the channels of the first network does is below the changed channel speed and a bandwidth speed of a high-priority channel is not decreased, and resetting the adjusted bandwidth speed on each of the channels of the first network.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 6:
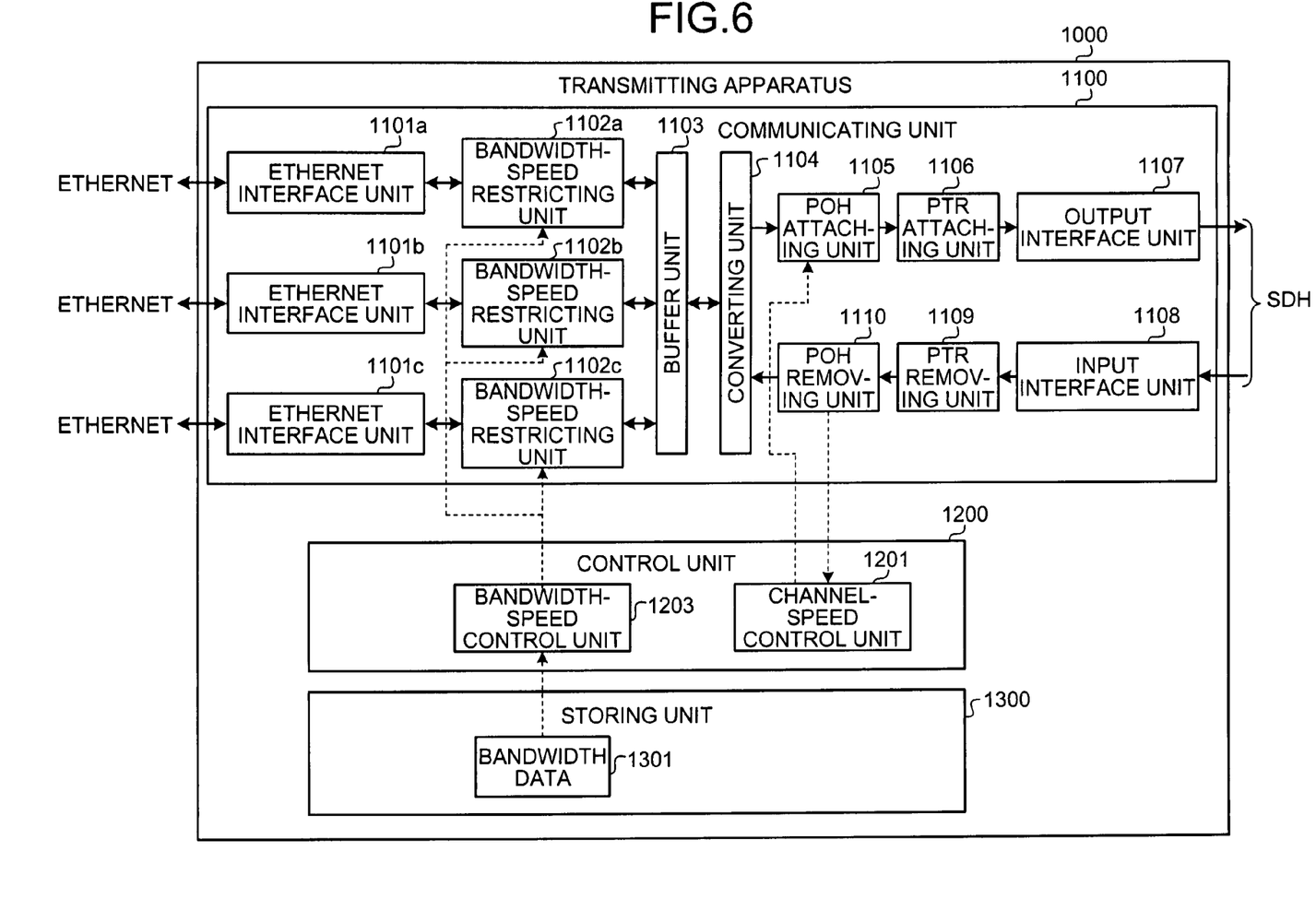
FIG. 6 is a block diagram of a transmitting apparatus according to a conventional technology.

FIG. 6 is a block diagram of a transmitting apparatus 1000 according to a conventional technology.

The transmitting apparatus 1000 links Ethernet networks and an SDH network. In the transmitting apparatus 1000, a plurality of Ethernet channels are linked to a single SDH channel by mapping each Ethernet channel as a different channel.

The transmitting apparatus 1000 includes a communicating unit 1100, a control unit 1200, and a storing unit 1300. The communicating unit 1100 performs various processes required to keep the networks connected and includes Ethernet interface units 1101a to 1101c, bandwidth-speed restricting units 1102a to 1102c, a buffer unit 1103, a converting unit 1104, a Path OverHead (POH) attaching unit 1105, a Pointer (PTR) attaching unit 1106, an output interface unit 1107, an input interface unit 1108, a PTR removing unit 1109, and a POH removing unit 1110.

The Ethernet interface units 1101a to 1101c are interface units connect the transmitting apparatus 1000 to the Ethernet networks. Only three Ethernet networks have been shown in FIG. 6. However, any number of Ethernet networks may be connected to the SDH network via the transmitting apparatus 1000.

The bandwidth-speed restricting units 1102a to 1102c are respectively paired with the Ethernet interface units 1101a to 1101c, and buffers or destroys Ethernet frames so that the output to the buffer unit 1103 does not exceed the bandwidth speed specified by the control unit 1200.

The buffer unit 1103 temporarily stores frames to absorb the difference between the processing speed of the bandwidth-speed restricting units 1102a to 1102c and the converting unit 1104. The converting unit 1104 performs capsuling and decapsuling of the Ethernet frames.

The POH attaching unit 1105 attaches a POH, required for control in virtual concatenation and LCAS, to an SDH frame obtained by capsuling the Ethernet frame. The PTR attaching unit 1106 attaches a PTR, required for multiplexing, to the SDH frame with the POH attached. The output interface unit 1107 outputs the SDH frame with the PTR attached to the SDH network.

The input interface unit 1108 receives the SDH frame sent to the transmitting apparatus 1000 from the SDH network. The PTR removing unit 1109 removes the PTR from the SDH frame received by the input interface unit 1108. The POH removing unit 1110 removes the POH from the SDH fame from which PTR has been removed and passes it on to the converting unit 1104.

The control unit 1200 controls the monitoring of the communicating unit 1100, and includes a channel-speed control unit 1201, and a bandwidth-speed control unit 1203. The channel-speed control unit 1201 implements the LCAS function, and gauges the status of the SDH channel based on the contents of POH removed by the POH removing unit 1110, and includes data required for controlling based on the status gauged in the POH to be attached by the POH attaching unit 1105.

The bandwidth-speed control unit 1203 specifies the bandwidth speed to the bandwidth-speed restricting units 1102a to 1102c based on bandwidth data 1301 stored in the storing unit 1300.

The storing unit 1300 stores various settings, such as the bandwidth data 1301. The bandwidth data 1301 pertains to bandwidth speed of each channel connected to the Ethernet interface units 1101a to 1101c. A network administrator enters the bandwidth data 1301 via a not shown administration terminal. When the network administrator enters the bandwidth speed, he/she takes care that the total bandwidth speed of all the channels does not exceed the speed of the SDH network, thus ensuring that frame loss resulting from insufficient SDH network speed.

Figure 7:
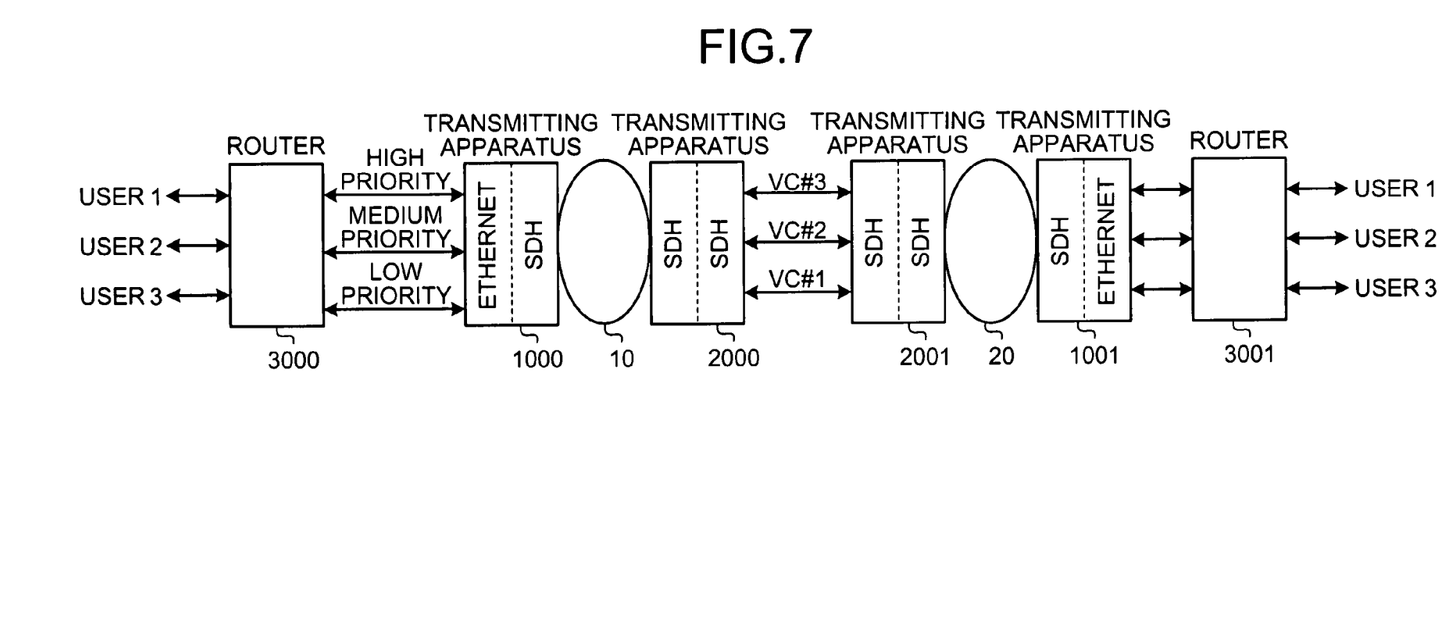
FIG. 7 is a schematic of a network configuration.

FIG. 7 is a schematic of the network configuration. The transmitting apparatus 1000 is connected to a router (L2 switch) 3000 equipped with a priority control function.

Three channels with the priority marked as high, medium, and low connect the transmitting apparatus 1000 and the router 3000. The router 3000 determines by a preset rule the priority of the Ethernet frame, and transmits the Ethernet frame over the channel corresponding to the determined priority to the transmitting apparatus 1000.

The high-priority channel is connected to the Ethernet interface unit 1101a of the transmitting apparatus 1000. The medium-priority channel is connected to the Ethernet interface unit 1101b of the transmitting apparatus 1000. The low-priority channel is connected to the Ethernet interface unit 1101c of the transmitting apparatus 1000.

The transmitting apparatus 1000 is also connected to another similar transmitting apparatus 2000 via an SDH ring 10. The transmitting apparatus 2000 is a regular transmitting apparatus that can be connected to an SDH network, and is connected back-to back to another transmitting apparatus 2001. Communication between the transmitting apparatuses 2000 and 2001 takes place by SDH signals.

The transmitting apparatus 2001 is connected to a transmitting apparatus 1001 that is similar to the transmitting apparatus 1000 via an SDH ring 20. The transmitting apparatus 1001 is connected to a router 3001, which is similar to the router 3000, via the Ethernet channel.

Thus, the network configuration shown in FIG. 7, two Ethernet networks are connected by two SDH rings 10 and 20, with an extension in between, the extension being two SDH networks that communicate by SDH signals sandwiched between the two SDH rings 10 and 20.

The SDH network includes the extension as well, and is made of three SDH channels of 50 Mbps multiplexed as virtually concatenated SDH channel group of 150 Mbps (50 Mbps×3). It is assumed that in the transmitting apparatus 1000, a bandwidth speed of 45 Mbps each is set for the three Ethernet channels connected to the router 3000.

Figure 8:
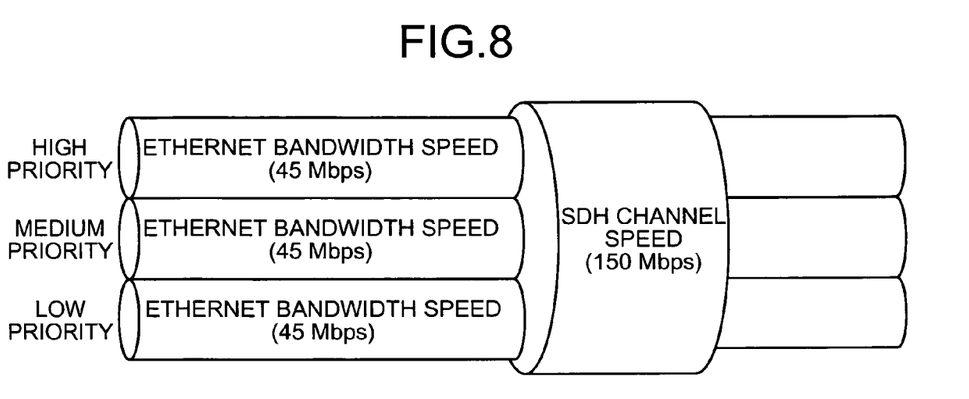
FIG. 8 is a schematic of a relation between bandwidth speeds of the Ethernet channels and the channel speed of the SDH channel group under normal conditions.

FIG. 8 is a schematic of a relation between bandwidth speeds of the Ethernet channels and the channel speed of the SDH channel group under normal conditions. The sum of the bandwidth speeds of the three Ethernet channels with the priority marked as high, medium, and low is 135 Mbps (45 Mbps×3), and is comfortably below the speed of 150 Mbps of the virtually concatenated SDH channel group.

Therefore, under normal conditions, stable communication is maintained between the transmitting apparatuses 1000 and 1001 and no frame loss occurs due to insufficient channel speed.

However, if failure occurs in one of the SDH channels of the virtually concatenated SDH channel group, the stability of communication is lost. Specifically, when one of the SDH channels of the channels of the virtually concatenated SDH channel group fails, the LCAS function carries out speed adjustment between the transmitting apparatuses 1000 and 1001 situated at the two ends of the virtually concatenated SDH channel group, and automatically reduces the channel speed of the SDH channel group to 100 Mbps (50 Mbps×2).

Figure 9:
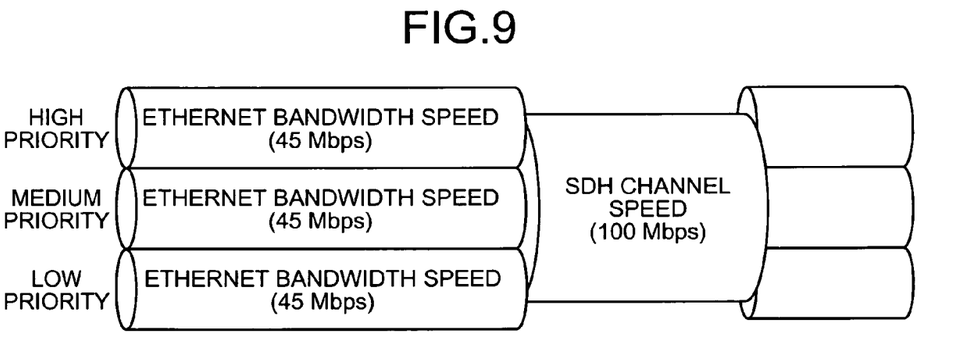
FIG. 9 is a schematic of a relation between bandwidth speeds of Ethernet channels and a channel speed of the SDH channel group when there is a drop in the speed of the SDH channel group.

FIG. 9 is a schematic of a relation between bandwidth speeds of Ethernet channels and a channel speed of the SDH channel group when there is a drop in the speed of the SDH channel group. The sum of the bandwidth speed of the three Ethernet channels with the priority marked as high, medium, and low of 135 Mbps is way above the channel speed of the SDH channel group of 100 Mbps. Thus, there is a loss of signals of about 12 Mbps from each Ethernet channel.

The loss of frames in the virtually concatenated SDH channel group occurs randomly, regardless of the priority control the router 3000 sets. Thus, there is a possibility of frames with the priority marked as high being lost, resulting in serious communication error.

Thus, in the conventional transmitting apparatus, LCAS dynamically changes the channel speed of the SDH channel group without regard to the priority control set at the Ethernet end, thus putting a question mark on the efficacy of the LCAS function in improving the channel quality.

Figure 1:
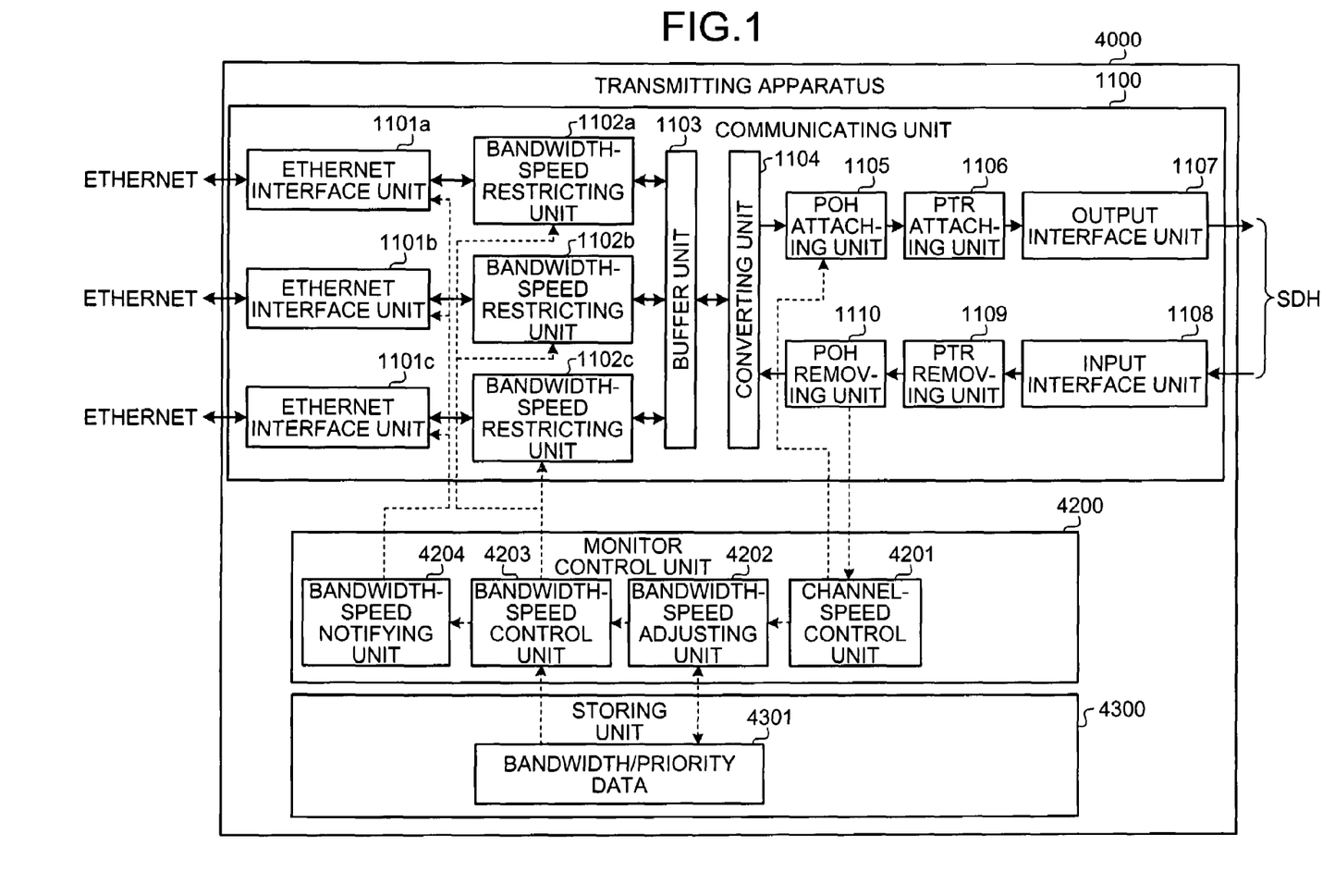
FIG. 1 is a block diagram of a transmitting apparatus according to an embodiment of the present invention.

FIG. 1 is a block diagram of a transmitting apparatus 4000 according to an embodiment of the present embodiment. The transmitting apparatus 4000 includes the communicating unit 1100, a control unit 4200, and a storing unit 4300. The communicating unit 1100 is identical to the communicating unit 1100 shown in FIG. 6 and hence is not explained again.

The control unit 4200 controls the monitoring of the communicating unit 1100 and includes a channel-speed control unit 4201, a bandwidth-speed adjusting unit 4202, a bandwidth-speed control unit 4203, and a bandwidth-speed notifying unit 4204.

The channel-speed control unit 4201 implements the LCAS function, and gauges the status of the SDH channel based on the contents of POH removed by the POH removing unit 1110, and includes data required for controlling based on the status gauged in the POH to be attached by the POH attaching unit 1105. Further, when the channel speed of the SDH channel group is dynamically changed, the channel-speed control unit 4201 notifies the fact as well as the changed speed of the virtually concatenated SDH channel group to the bandwidth-speed adjusting unit 4202.

The bandwidth-speed adjusting unit 4202 takes into account the priority and adjusts the bandwidth speed to be conveyed to the bandwidth-speed restricting units 1102a to 1102c. The bandwidth-speed adjusting unit 4202 adjusts the bandwidth speed based on bandwidth/priority data 4301 and the changed speed of the virtually concatenated SDH channel group notified by the channel-speed control unit 4201 stored in the storing unit 4300.

Figure 2:
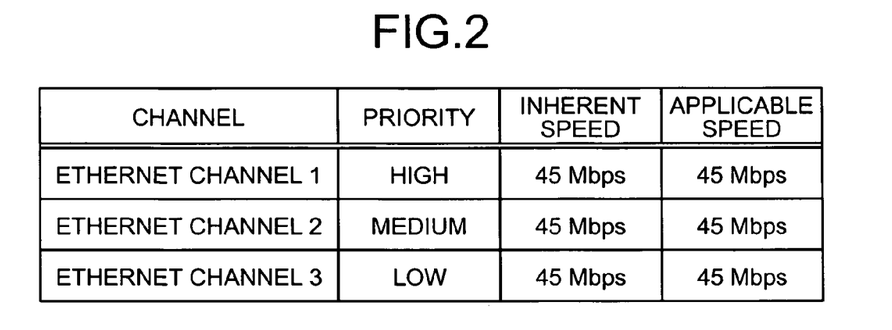
FIG. 2 is a table of an example of bandwidth/priority data.

FIG. 2 is a table of an example of the bandwidth/priority data 4301. The bandwidth/priority data 4301 includes the fields Channel, Priority, Inherent speed, and Applicable speed, and contains the data of each channel. The field Channel indicates the identification tag assigned to the channel. The field Priority indicates the priority of the channel. The field Inherent speed indicates the original bandwidth speed of the channel. The field Applicable speed indicates the bandwidth speed arrived at by the bandwidth-speed adjusting unit 4202 after adjustment. The network administrator sets the priority and the inherent speed via the administration terminal. In the example shown in FIG. 2, three orders of priority have been set, namely, High, Medium, and Low. It is also possible to break down the priority into finer divisions.

Upon receiving the notification from the channel-speed control unit 4201 that the channel speed of the SDH channel group has changed, the bandwidth-speed adjusting unit 4202 retrieves and adds up the inherent speed of all the channels from the bandwidth/priority data 4301. If the sum of the inherent speed of the channels is less than or equal to the changed speed of the virtually concatenated SDH channel group notified by the channel-speed control unit 4201, the bandwidth-speed adjusting unit 4202 sets the inherent speed values unchanged in the Applicable speed field of the bandwidth/priority data 4301.

If the sum of the inherent speed of the channels is greater than the changed speed of the virtually concatenated SDH channel group notified by the channel-speed control unit 4201, the bandwidth-speed adjusting unit 4202 reduces the bandwidth speed of each channel from an initial value of the bandwidth speed, which is the inherent speed of the channel, retrieved from the bandwidth/priority data 4301, so that the sum of the new bandwidth speed of the channels is less than or equal to the channel speed of the SDH channel group. When carrying out the reduction of the channel speed, the bandwidth-speed adjusting unit 4202 refers to the priority set in the bandwidth/priority data 4301 and reduces the bandwidth speed starting from the channel with low priority and proceeding towards the high priority so that loss of high-priority frames is avoided.

Once the applicable speeds of the channels are set in the bandwidth/priority data 4301, the bandwidth-speed adjusting unit 4202 instructs the bandwidth-speed control unit 4203 to reflect the applicable speed on the bandwidth-speed restricting units 1102a to 1102c.

The bandwidth-speed control unit 4203 follows the instruction from the bandwidth-speed adjusting unit 4202 and specifies the bandwidth speed for the bandwidth-speed restricting units 1102a to 1102c. After following the instruction, the bandwidth-speed control unit 4203 notifies the content of the specification for the bandwidth-speed restricting units 1102a to 1102c to the bandwidth-speed notifying unit 4204.

The bandwidth-speed notifying unit 4204 notifies the bandwidth speed specified for the bandwidth-speed restricting units 1102a to 1102c to the router. When the bandwidth speed of the low-priority Ethernet channel drops accompanying a drop in the channel speed of the SDH channel group, there is a high likelihood of a lost of the frames in the low-priority channel, because of the limitations of the bandwidth-speed control unit of the internet channel in question. However, if the bandwidth speed is conveyed to the router, it can expected that the router may enforce its superior priority control function on the low-priority Ethernet channel and prevent loss of important frames.

The process accompanying a change in the channel speed of the SDH channel group is applicable when the speed drops as well as when there is an increase in the speed. In other words, when the channel speed of the SDH channel group drops, a process for reducing the bandwidth speed of the Ethernet channels is carried out. Similarly, when the channel speed of the SDH channel group increases, a process for increasing the bandwidth speed of the Ethernet channels is carried out.

An example of the network configuration shown in FIG. 7 is described where the transmitting apparatus 1000 is replaced with the transmitting apparatus 4000. Under normal conditions, the transmitting apparatus 4000 functions similar to the transmitting apparatus 1000 and the correlation between the bandwidth speed of the Ethernet channels and the channel speed of the SDH channel group is as per FIG. 8.

However, the transmitting apparatus 4000 performs differently from the transmitting apparatus 1000 if failure occurs in one of the SDH channels of the virtually concatenated SDH channel group. If one of the SDH channels fails, the transmitting apparatus 4000 not only causes the channel speed of the SDH channel group to drop, but also causes a drop in the bandwidth speed of the low-priority Ethernet channel, taking into account the priority set in the bandwidth/priority data 4301.

Figure 3:
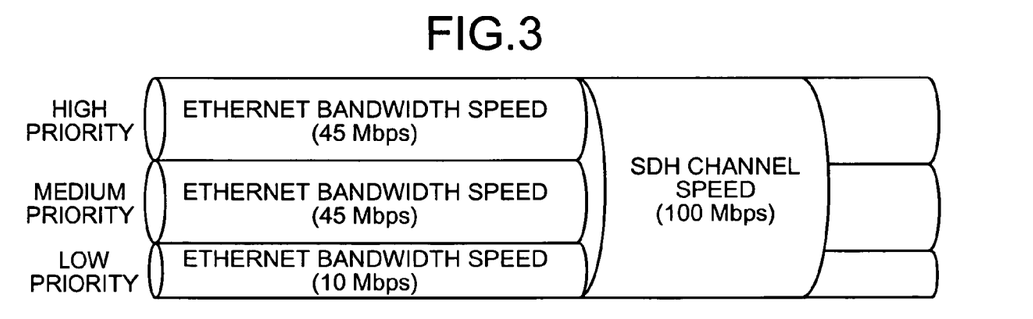
FIG. 3 is a schematic of a relation between bandwidth speeds of Ethernet channels and a channel speed of an SDH channel group when there is a drop in the channel speed of the SDH channel group.

FIG. 3 is a schematic of a relation between bandwidth speeds of Ethernet channels and a channel speed of an SDH channel group when there is a drop in the channel speed of the SDH channel group. When the channel speed of the SDH channel group is reduced to 100 Mbps (50 Mbps×2), the transmitting apparatus 4000 causes of the bandwidth speed of the low-priority Ethernet to drop to 10 Mbps so that the total bandwidth speed of the Ethernet channels does not exceed 100 Mbps. Thus, the high-priority and medium-priority Ethernet channels can maintain stable communication at their inherent bandwidth speed of 45 Mbps.

Thus, when faced with the possibility of frame loss due to a drop in the speed of virtually concatenated SDH channel group, the transmitting apparatus 4000 according to the present embodiment adjusts the bandwidth speed of the Ethernet channels while taking into account a priority preset for the Ethernet channels. Consequently, loss of high-priority frames is prevented, and the dynamic change in the channel speed brought about by LCAS is effective in improving the channel quality.

Further, if the channel speed of the SDH channel group increases due to failure restoration, the transmitting apparatus 4000 according to the present embodiment causes the original bandwidth speed of the Ethernet channels to be automatically restored, thus cutting down network administration cost.

Figure 4:
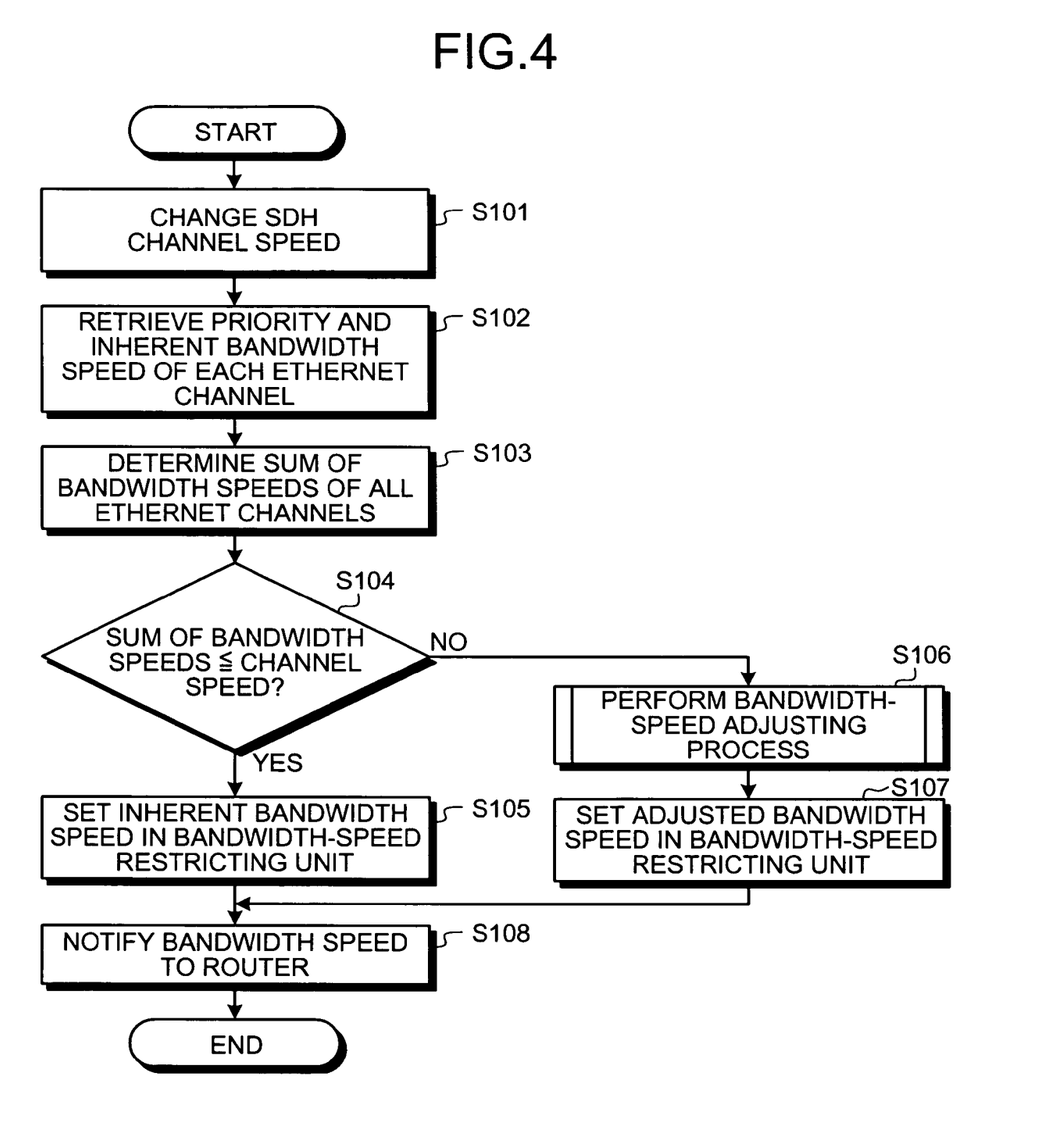
FIG. 4 is a flowchart of a process procedure of the transmitting apparatus shown in FIG. 1 when there is a change in the channel speed of the SDH channel group.

FIG. 4 is a flowchart of the process procedure of the transmitting apparatus 4000 when there is a change in the channel speed of the SDH channel group. When the channel-speed control unit 4201 changes the channel speed of the SDH channel group (step S101), the bandwidth-speed adjusting unit 4202 retrieves the priority and the bandwidth speed of the Ethernet channels from the bandwidth/priority data 4301 (step S102) and determines the sum of the inherent bandwidth speed of all the Ethernet channels (step S103).

If the sum of the inherent bandwidth speed of the Ethernet channels is less than or equal to the channel speed of the SDH channel group ("Yes" at step S104), the bandwidth-speed adjusting unit 4202 leaves the inherent bandwidth speed of the Ethernet channels unchanged, and the bandwidth-speed control unit 4203 specifies the bandwidth speed to the bandwidth-speed restricting units 1102a to 1102c (step S105). The bandwidth-speed notifying unit 4204 conveys the bandwidth speed to the router (step S108), ending the process.

If the sum of the inherent bandwidth speed of the Ethernet channels is greater than the channel speed of the SDH channel group ("No" at step S104), the bandwidth-speed adjusting unit 4202 adjusts the bandwidth speed of the each of the Ethernet channels by a bandwidth-speed adjustment process described later (step S106), and the bandwidth-speed control unit 4203 specifies the bandwidth speed to the bandwidth-speed restricting units 1102a to 1102c (step S107). The bandwidth-speed notifying unit 4204 conveys the bandwidth speed to the router (step S108), ending the process.

Figure 5:
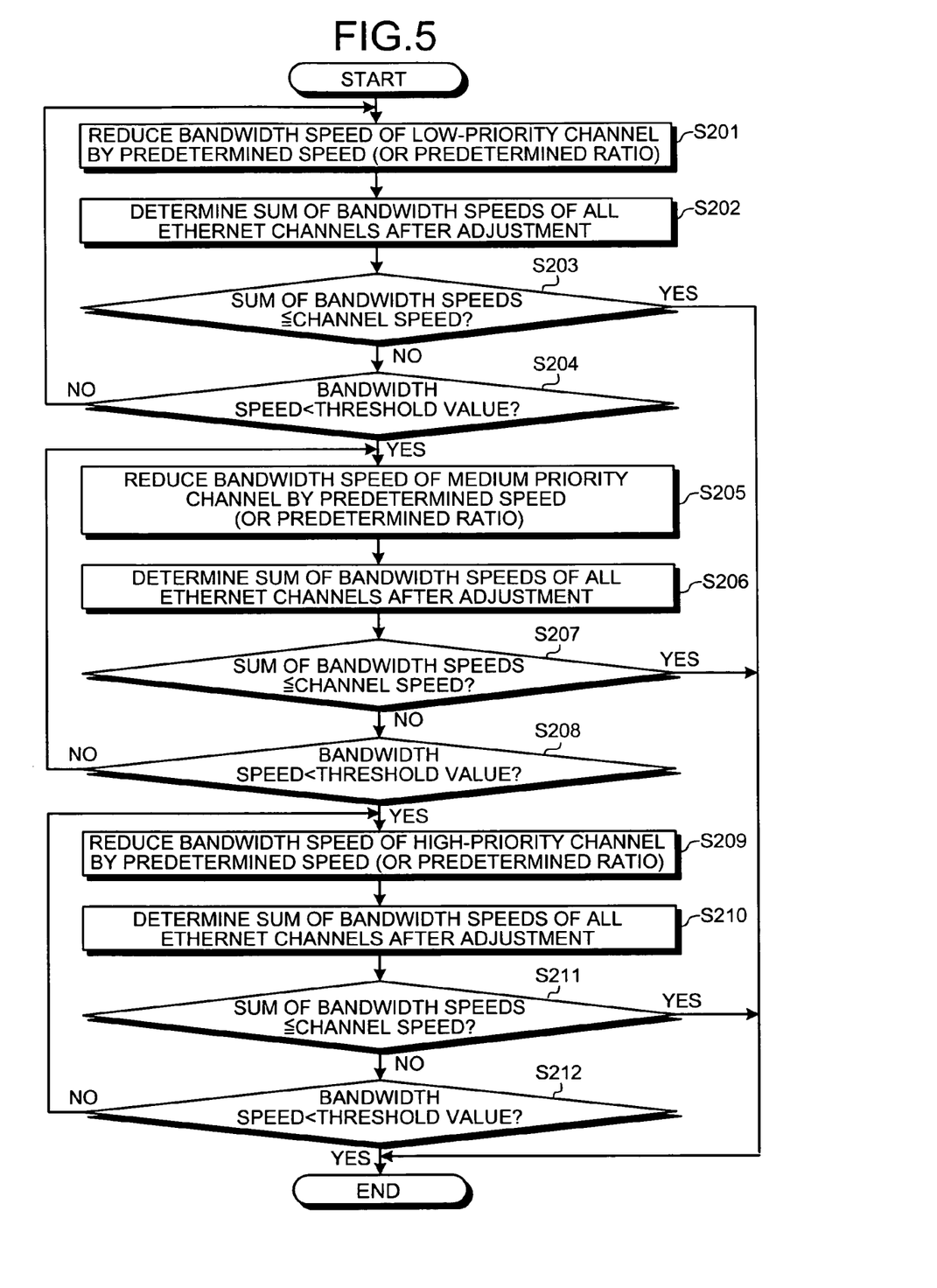
FIG. 5 is a flowchart of a bandwidth-speed adjustment process shown in FIG. 4.

FIG. 5 is a flowchart of the bandwidth-speed adjustment process shown in FIG. 4. The bandwidth-speed adjusting unit 4202 reduces the initial bandwidth speed of each Ethernet channel by a definite speed (or a definite ratio) (step S201).

The bandwidth-speed adjusting unit 4202 then determines the sum of the bandwidth speed of the Ethernet channels (step S202), and if the sum is less than or equal to the changed speed of the virtually concatenated SDH channel group ("Yes" at step S203), ends the bandwidth-speed adjustment process. If the sum is greater than the changed speed of the virtually concatenated SDH group ("No" at step S203), the bandwidth-speed adjusting unit 4202 checks whether the bandwidth speed of the low-priority channel is less than a predetermined threshold value (step S204), and if not ("No" at step S204), returns to step S201 and further reduces the bandwidth speed of the low-priority channel.

If the bandwidth speed of all the low-priority channels is less than the predetermined threshold value ("Yes" at step S204), the bandwidth-speed adjusting unit 4202 reduces the bandwidth speed of the medium-priority channel by a definite speed (or a definite ratio) (step S205).

The bandwidth-speed adjusting unit 4202 again determines the sum of the bandwidth speed of the Ethernet channels (step S206), and if the sum is less than or equal to the changed speed of the virtually concatenated SDH channel group ("Yes" at step S207), ends the bandwidth speed adjusting process. If the sum is greater than the changed speed of the virtually concatenated SDH channel group ("No" at step S207), the bandwidth-speed adjusting unit 4202 checks whether the bandwidth speed of the medium-priority channel is less than a predetermined threshold value (step S208), and if not ("No" at step S208), returns to step S205 and further reduces the bandwidth speed of the medium-priority channel.

If the bandwidth speed of all the medium-priority channels is less than the predetermined threshold value ("Yes" at step S208), the bandwidth-speed adjusting unit 4202 reduces the bandwidth speed of the high-priority channel by a definite speed (or a definite ratio) (step S209).

The bandwidth-speed adjusting unit 4202 once again determines the sum of the bandwidth speed of all the Ethernet channels (step S210), and if the sum is less than or equal to the changed speed of the virtually concatenated SDH channel group ("Yes" at step S211), ends the bandwidth speed adjusting process. If the sum is greater than the changed speed of the virtually concatenated SDH channel group ("No" at step S211), the bandwidth-speed adjusting unit 4202 checks whether the bandwidth speed of the high-priority channel is less than a predetermined threshold value (step S212), and if not ("No" at step S212), returns to step S209 and further reduces the bandwidth speed of the high-priority channel.

If the bandwidth speed of all the high-priority channels is less than the predetermined threshold value ("Yes" at step S212), the bandwidth-speed adjusting unit 4202 ends the bandwidth-speed adjustment process.

Thus, according to the present embodiment, when faced with a possibility of frame loss due to a drop in the speed of a virtually concatenated SDH channel group, the transmitting apparatus adjusts the bandwidth speed of all Ethernet channels while taking into account a priority preset for the Ethernet channels. Consequently, loss of high-priority frames is prevented, and effective improvement in the channel quality can be realized by the dynamic change in the channel speed brought about by LCAS.

According to the present embodiment, the transmitting apparatus is shown to connect Ethernet networks and SDH networks. The present invention can be equally applied in a combination of other kinds of networks.

As describe above, according to an embodiment of the present invention, if there is a change in a channel speed of a one network connected to a transmitting apparatus according to the present invention, bandwidth speed of channels of a second network, also connected to the transmitting apparatus, is adjusted taking into account a priority preset for the channels of the second network and such a way that a sum of the bandwidth speed of the channels of the second network does not exceed the channel speed. Consequently, grave communication errors resulting from a drop in the channel speed connected to the transmitting apparatus are avoided and the quality of communication can be improved.

Furthermore, according to an embodiment of the present invention, the LCAS is implemented to reduce the channel speed of the first network connected to the transmitting apparatus according to the present invention, and if the sum of the bandwidth speed of the channels of the second network exceeds the channel speed, the bandwidth speed of the channels of the second network is adjusted while taking into account a priority preset for the channels. Consequently, grave communication errors resulting from a drop in the channel speed are avoided, and effective improvement in the channel quality can be realized by the automatic change in the channel speed.

Moreover, according to an embodiment of the present invention, the LCAS is implemented for reducing the channel speed of the first network connected to the transmitting apparatus, and if the channel speed is greater than the sum of the bandwidth speed of the channels of the second network, a preset inherent bandwidth speed is set for each channel. Consequently, the bandwidth speed that was reduced accompanying a reduction in the channel speed can be is restored to inherent speed, thus cutting down network administration cost.

Furthermore, according to an embodiment of the present invention, when the bandwidth speed is changed, the changed bandwidth speed is conveyed to a priority control unit (for example, a router), enabling the priority control unit to implement priority control in response to the bandwidth speed. Consequently, loss of important frames can be minimized.

Moreover, according to an embodiment of the present invention, a channel speed changing method is implemented in such a way that when the channel speed of one network connected to the transmitting apparatus drops, the bandwidth speed of the channels of the second network is adjusted while taking into account the priority preset for the channels and in such a way that the sum of the bandwidth speed of the channels of the second network does not exceed the channel speed. Consequently, grave communication errors resulting from a drop in the channel speed connected to the transmitting apparatus are avoided and the quality of communication can be improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transmitting apparatus that connects a first network and a second network, the first network including a plurality of channels each of which having a preset priority and a predetermined bandwidth speed, the transmitting apparatus comprising:

a bandwidth-speed adjusting unit that retrieves, when a channel speed of the second network changes, the changed channel speed, if a sum of inherent bandwidth speeds of the channels of the first network exceeds the changed channel speed, adjusts the bandwidth speed of the first network in such a manner that a sum of the bandwidth speeds of the channels of the first network is below the changed channel speed and a bandwidth speed of a high-priority channel is not decreased from an inherent bandwidth speed and resets the bandwidth speed on each of the channels of the first network to the adjusted bandwidth speed, and if a bandwidth speed of one of the channels is decreased from an inherent bandwidth speed of the one of the channels and the sum of the inherent bandwidth speeds is equal to or less than the changed channel speed, resets the bandwidth speed on each of the channels of the first network to the inherent bandwidth speed.

2. A transmitting apparatus that connects a first network and a second network, the first network including a plurality of channels, the second network being capable of dynamically adjusting a channel speed thereof by using a link capacity adjustment scheme, the transmitting apparatus comprising:

a storing unit that stores a priority and an inherent bandwidth speed for each of the channels of the first network; and a bandwidth-speed adjusting unit that retrieves, when the channel speed of the second network changes, the changed channel speed, and if a sum of inherent bandwidth speeds stored in the storing unit exceeds the changed channel speed, takes the inherent bandwidth speed stored in the storing unit as the bandwidth speed of the channels of the first network, adjusts the bandwidth speed of the first network in such a manner that a sum of the bandwidth speeds of the channels of the first network is below the changed channel speed and a bandwidth speed of a channel for which a high priority is set in the storing unit is not decreased, and resets the bandwidth speed on each of the channels of the first network to the adjusted bandwidth speed, and if a bandwidth speed of one of the channels is decreased from an inherent bandwidth speed of the one of the channels and the sum of the inherent bandwidth speeds stored in the storing unit is equal to or less than the changed channel speed, resets the bandwidth speed on each of the channels of the first network to the inherent bandwidth speed.

3. The transmitting apparatus according to claim 2, further comprising:
a bandwidth-speed notifying unit that notifies, when the bandwidth-speed adjusting unit resets the bandwidth speed on each of the channels of the first network, the adjusted bandwidth speed to a priority control unit connected to a corresponding channel.

4. A channel-speed adjusting method for a transmitting apparatus that connects a first network and a second network, the first network including a plurality of channels each of which having a preset priority and a predetermined bandwidth speed, the channel-speed adjusting method comprising:
changing a channel speed of the second network; and
bandwidth-speed adjusting including
if a sum of inherent bandwidth speeds of the channels of the first network exceeds the changed channel speed, adjusting the bandwidth speed of the first network in such a manner that a sum of the bandwidth speeds of the channels of the first network is below the changed channel speed and a bandwidth speed of a high-priority channel is not decreased from an inherent bandwidth speed; and
resetting the bandwidth speed on each of the channels of the first network to the adjusted bandwidth speed; and
if a bandwidth speed of one of the channels is decreased from an inherent bandwidth speed of the one of the channels and the sum of the inherent bandwidth speeds of the channels of the first network does not exceed the changed channel speed, resetting the bandwidth speed on each of the channels of the first network to the inherent bandwidth speed.

5. A channel-speed adjusting method for a transmitting apparatus that connects a first network and a second network, the first network including a plurality of channels, the channel-speed adjusting method comprising:
changing dynamically a channel speed of the second network by using a link capacity adjustment scheme;
bandwidth-speed-over determining including
retrieving an inherent bandwidth speed for each of the channels of the first network stored in a storing unit in advance; and
determining whether a sum of the inherent bandwidth speeds exceeds the changed channel speed; and
bandwidth-speed adjusting including
if a sum of the inherent bandwidth speeds of the channels of the first network is determined to exceed the changed channel speed at the determining, taking the inherent bandwidth speed stored in the storing unit as the bandwidth speed of the channels of the first network;
adjusting the bandwidth speed of the first network in such a manner that a sum of the bandwidth speeds of the channels of the first network is below the changed channel speed and a bandwidth speed of a high-priority channel is not decreased; and
resetting the bandwidth speed on each of the channels of the first network to the adjusted bandwidth speed; and
if a bandwidth speed of one of the channels is decreased from an inherent bandwidth speed of the one of the channels and the sum of the inherent bandwidth speeds of the channels of the first network is determined not to exceed the changed channel speed, resetting the bandwidth speed on each of the channels of the first network to the inherent bandwidth speed.

6. The channel-speed adjusting method according to claim 5, further comprising:
notifying, when the bandwidth speed of each of the channels of the first network is reset at the bandwidth-speed adjusting, the reset bandwidth speed to a priority control unit connected to a corresponding channel.

* * * * *